April 5, 1966     W. H. CILKER ETAL     3,243,949
METHOD OF TREATING GLASS ROVING
Original Filed July 10, 1961
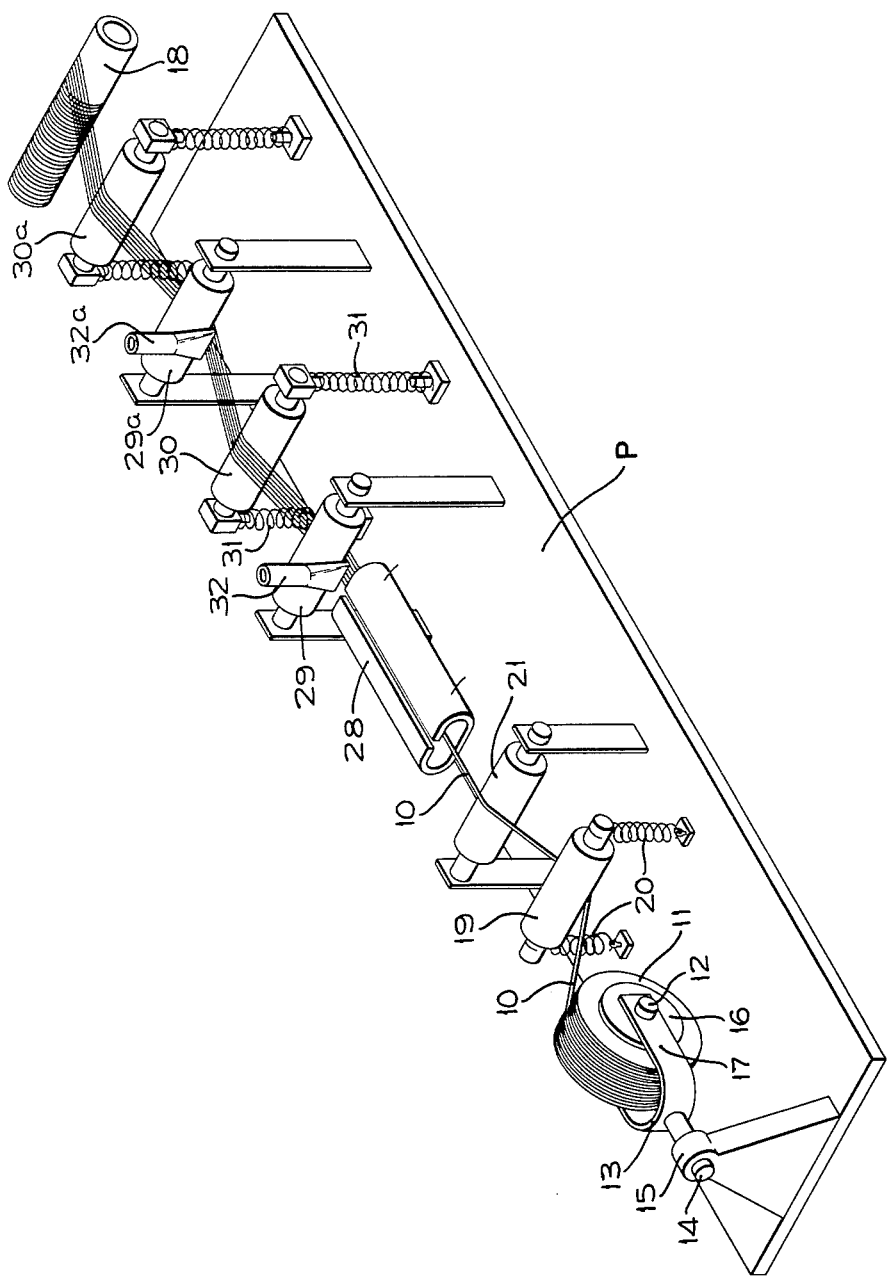
INVENTORS
WILLIAM H. CILKER
WILLIAM A. SHRODE
BY *Hans G. Hofmeister*,
ATTORNEY 3,243,949
METHOD OF TREATING GLASS ROVING
William H. Cilker, Los Gatos, and William A. Shrode, San Jose, Calif., assignors to FMC Corporation, San Jose, Calif., a corporation of Delaware
Original application July 10, 1961, Ser. No. 125,915, now Patent No. 3,154,908, dated Nov. 3, 1964. Divided and this application Feb. 28, 1964, Ser. No. 352,413
7 Claims. (Cl. 57—162)

This application is a division of application Serial No. 125,915, filed July 10, 1961, now U.S. Patent No. 3,154,908.

The present invention pertains to reinforced plastic products and more particularly pertains to a method for continuously untwisting and wetting or coating with resin the individual filaments of a twisted glass fiber strand.

Many plastic products are formed with one or more overlays of glass fiber roving strands that are resin impregnated and bonded thereby to the plastic article for increasing its tensile and compressive strength. For example, fiberglass reinforced plastic pipe is commonly wrapped with helically applied and resin-impregnated glass roving for strengthening purposes. As manufactured, each strand of roving is comprised of a large number of continuous glass filaments and is usually twisted so that the filaments are intertwined, a binding agent being incorporated in the roving to prevent its splaying.

To a large degree, the ultimate strength of the roving depends on how well each filament of the strand is wetted with resin. In order that a maximum wetting of each filament is obtained, it is necessary to first separate the filaments from each other and from the binding agent initially applied to the filaments. The usual practice is to abrade the roving by dragging it over fixed bars to remove the binder and to expose the inner filaments, and then to transport the roving strand through a resin bath. This described operation does not destroy the intertwined formation of the strand, however, or completely remove the binding agent. As a result, the binding agent remaining in the partially twisted roving permits only a superficial wetting of the filaments. Consequently, the developed strength of the roving after the resin has cured is far short of its potential strength.

In accordance with the teachings of the present invention, the separate filaments of glass roving are more thoroughly wetted with resin than has heretofore been achieved. Consequently, after the roving has been resin-wetted and applied on the member to be reinforced, and after the resin has cured, the strength of the roving more nearly approaches its maximum attainable strength.

Accordingly, an object of the present invention is to provide an improved method of resin-impregnating glass roving.

Another object of this invention is the provision of a process for separating the glass filaments of a roving strand so that resin may be applied to the filaments.

These and other objects and advantages of the present invention will become apparent from the following description and the accompanying drawing which is a diagrammatic perspective of a machine for carrying out the fiber conditioning process of the present invention.

The various components comprising an exemplary embodiment of the present invention are secured to a support platform P. A glass filament roving strand 10 to be impregnated with resin is wound upon a supply spool 11 which is mounted for rotation upon an axle 12 that is received in a support yoke 13. A cylindrical shaft 14 of the yoke 13 is rotatably mounted in a bearing 15 and extends in a plane normal to the axle 12 so that, if necessary, the spool and the yoke may rotate around the axis of the shaft 14 and the roving may untwist as it is unwound from the supply spool.

A magnetic brake 16 or other means is connected between the supply spool 11 and an arm 17 of the yoke 13 to provide a predetermined resistance to rotation of the spool. This resistance varies according to the size of roving to be processed and causes a predetermined tensile stress in the unwound strand. The roving strand 10 is unwound from the spool by any ordinary means, such as by the pulling force developed by the wrapping of the strand on a rotating article 18 to be reinforced, a take up mechanism, or the like. From the supply spool 11, the roving strand 10 is fed under a first guide and tensioning roller 19 which is urged downwardly by tension springs 20 to stress the roving strand 10, and over a fixed guide roller 21.

The roving will not immediately untwist to any large degree because the binding agent with which its filaments are held together prevent its untwisting. In order to soften the binding agent and permit the roving strand to untwist so that its filaments are separated from each other, the strand is pulled through a tubular heater unit 28 which is maintained at a temperature of approximately 800° F.

In the processing of one particular type and size of roving (Owens-Corning Fiberglas size 801), a twenty inch long heater was used at the stated temperature, while the roving strand was advanced therethrough at a rate of ten feet per minute. The roving leaving the discharge end of the heater was at a temperature of approximately 600° F. At this temperature the binder used in the roving is no longer effective and accordingly, the tensioned roving strand untwists.

The untwisted roving leaving the heater 28 is threaded under a fixed, guide roller 29 and over a second guide and tensioning roller 30 that is urged upwardly against the roving strand by compression springs 31. The rollers 29 and 30 function to spread out the roving and expose its separate filaments to a flow of resin discharged from a small orifice, not shown, in a discharge nozzle 32 that is closely spaced from the discharge end of the heater 28. The nozzle 32 is fixed a short distance from the glass filaments of the splayed roving strand 10 leaving the discharge end of the heater 28. Since the filaments are heated, the filaments cause the resin flowing from the nozzle onto the filaments to also become heated. As this heating of the resin occurs, the viscosity of the resin proportionately decreases and the thin resin readily flows around and between the individual filaments to cause their thorough wetting and to eliminate substantially all dry voids. Any voids which might remain are filled with resin as the saturated strand passes around the tensioning rollers 29 and 30 since the tensioning of the strand causes the resin to be extruded or forced from between adjacent filaments.

If the roving is of the size and type previously mentioned, the wetted strand may be wound directly from the roller 30 onto the object to be reinforced. As was previously mentioned, the winding of the strand onto the reinforced object can provide the drawing force pulling the roving strand through the described apparatus, or a separate takeup mechanism may be provided. In either case, of course, the thoroughly wetted roving is applied to the article to be reinforced before the resin is cured. However, it will be evident that the utility of the disclosed process is not limited to thermosetting resins because a thermoplastic, cold setting resin can also be efficiently applied by the nozzle 32. In the illustrated embodiment, the reconditioned roving is applied to the object 18 while the strands are separated. It is of course within the scope of the present invention to regroup the individual strands by a suitable mechanism and apply the reconstituted roving to the object.

If a rapid curing thermosetting resin is used, it is preferable to apply only a very small amount of resin from the nozzle 32 and to then feed the splayed and partially coated strand under a second resin nozzle 32a, wherein the resin application is completed, and then around tensioning rollers 29a and 30a which are identical to the rollers 29 and 30. The reason for using this arrangement is that the rollers 29 and 30, being closely spaced from the heater and in intimate contact with the hot filaments, might tend to heat up and gradually accumulate minute deposits of cured resin. This cured resin is inconvenient to remove during operation of the apparatus so the volume of resin applied by the nozzle 32 is purposely made small so as to avoid contaminating the rollers. The rollers 29 and 30 may be hollow and cooled by circulating water but this is unnecessary when two resin nozzles are used. After the second resin application by the nozzle 32a, the strand is ready to be used as a reinforcement wrapping directly upon leaving the roller 30a.

While a particular embodiment of the present invention has been shown and described it will be understood that the process of this invention is capable of modification and variation without departing from the principles of the invention and that the scope of the invention should be limited only by the scope and proper interpretation of the claims appended hereto.

The invention having thus been described, that which is believed to be new, and for which protection by Letters Patent is desired, is:

1. The method of impregnating with resin a twisted glass fiber roving strand which contains a binding agent, comprising the steps of tensioning the strand to a substantially linear condition, simultaneously heating the strand to loosen the binding agent therein and permit the strand to untwist so that its filaments are separated, and flowing resin onto the heated filaments so that the resin is heated and its viscosity is lowered to cause it to freely flow between and around the filaments.

2. The method of impregnating with resin a twisted glass fiber roving strand which contains a binding agent, comprising the steps of tensioning the strand to a substantially linear condition, heating the strand to loosen the binding agent therein and permit the strand to untwist so that its filaments are separated, flowing resin onto the filaments, and threading the splayed and tensioned strand over a roller to forcibly move resin around and between the filaments.

3. A method of applying to an object resin reinforced glass fiber roving which contains a binding agent comprising the steps of tensioning the roving, bending and heating the tensioned roving to loosen the binding agent from the fiber filaments, moving the filaments laterally to separate them from each other, applying a coating of uncured resin to each filament, and wrapping the resin-covered filaments on the object.

4. A method of applying to an object resin reinforced glass fiber roving which contains a binding agent comprising the steps of tensioning the roving, bending and heating the tensioned roving to loosen the binding agent from the fiber filaments, moving the filaments laterally to separate them from each other, applying a coating of uncured resin to each filament, regrouping the reconditioned fibers to form a resin-impregnated multi-fiber strand, and wrapping the strand on the object.

5. The method of impregnating with resin a twisted glass fiber roving strand which contains a binding agent comprising the steps of tensioning the strand, heating the strand to loosen the binding agent therein, separating the filaments of the unbound strand, and flowing resin onto the filaments so that the resin flows over all of the strand.

6. A method of applying to an object a resin reinforced glass fiber roving which contains a binding agent comprising the steps of tensioning the roving, heating the tensioned roving to loosen the binding agent from the fiber filaments, moving the filaments laterally to separate them from each other, applying a coating of resin to each filament, and wrapping the resin covered filament on the object.

7. A method of impregnating with resin a twisted glass fiber roving strand which contains a binding agent comprising the steps of tensioning the strand, heating the strand to loosen the binding agent therein, separating the filaments of the strand, flowing resin on the filaments at a first location, again tensioning the filaments after flowing the resin on to them, and flowing a second coat of resin on to the filaments so that the filaments have cooled substantially before the second coat of resin is applied.

References Cited by the Examiner

UNITED STATES PATENTS

| 2,718,583 | 9/1955 | Noland et al. | 156—172 X |
| 3,002,534 | 10/1961 | Noland | 156—172 X |

MERVIN STEIN, *Primary Examiner.*